United States Patent [19]
Owen

[11] Patent Number: 6,131,717
[45] Date of Patent: Oct. 17, 2000

[54] BRAKING ROLLER

[75] Inventor: Frank Owen, Anaheim, Calif.

[73] Assignee: Pemco Engineers, Corona, Calif.

[21] Appl. No.: 09/092,807

[22] Filed: Jun. 5, 1998

[51] Int. Cl.[7] .................................................. B65G 13/00
[52] U.S. Cl. ...................... 193/35 A; 188/82.1; 192/12 B
[58] Field of Search .............................. 188/82.74, 82.77,
188/82.9, 82.1, 83; 192/12 B; 193/35 A

[56] References Cited

U.S. PATENT DOCUMENTS

| | | | |
|---|---|---|---|
| 2,277,134 | 3/1942 | Nelson | 188/83 |
| 2,760,736 | 8/1956 | Mihalko et al. | 242/84.5 |
| 3,071,222 | 1/1963 | Koenig et al. | 192/12 |
| 3,312,320 | 4/1967 | Froio | 193/35 |
| 3,713,521 | 1/1973 | Moritake | 193/37 |
| 3,918,561 | 11/1975 | Isacsson | 193/35 A |
| 4,096,904 | 6/1978 | Donofrio | 160/299 |
| 4,723,646 | 2/1988 | Scheneman, Jr. | 193/35 A |
| 5,110,169 | 5/1992 | Shepherd et al. | 294/119.4 |
| 5,147,020 | 9/1992 | Scherman et al. | 193/35 A |
| 5,259,565 | 11/1993 | Hitomi | 242/245 |

Primary Examiner—Robert J. Oberleitner
Assistant Examiner—Bradley King
Attorney, Agent, or Firm—James E. Brunton

[57] ABSTRACT

An improved braking roller apparatus for preventing unintended movement of cargo containers within cargo compartments of the character found in cargo transport vehicles such as cargo aircraft. The improved braking roller apparatus includes highly novel, internal friction producing elements that smoothly and effectively resist rotation of a pair of cooperating rotors which are driven by a uniquely configured ULD engaging outer housing. The rotors and the cooperating friction elements in turn cooperate with a one way roller clutch assembly in a manner to positively impede rotation of the cargo container engaging outer housing in a first direction which allowing its free, unrestricted rotation in an opposite direction.

14 Claims, 7 Drawing Sheets

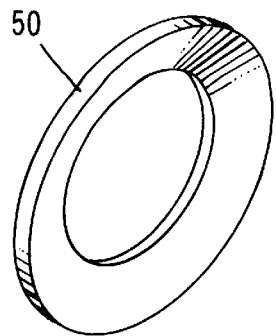
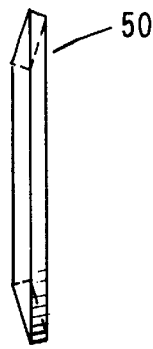
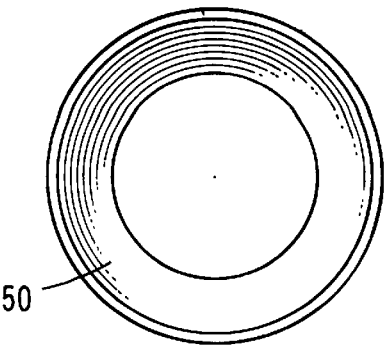
FIG.10  FIG.11  FIG.12
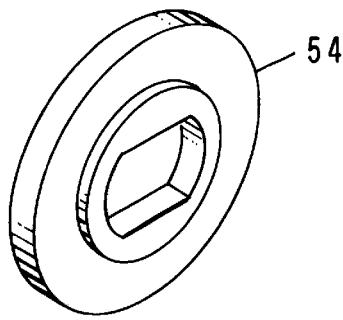
FIG.13  FIG.14
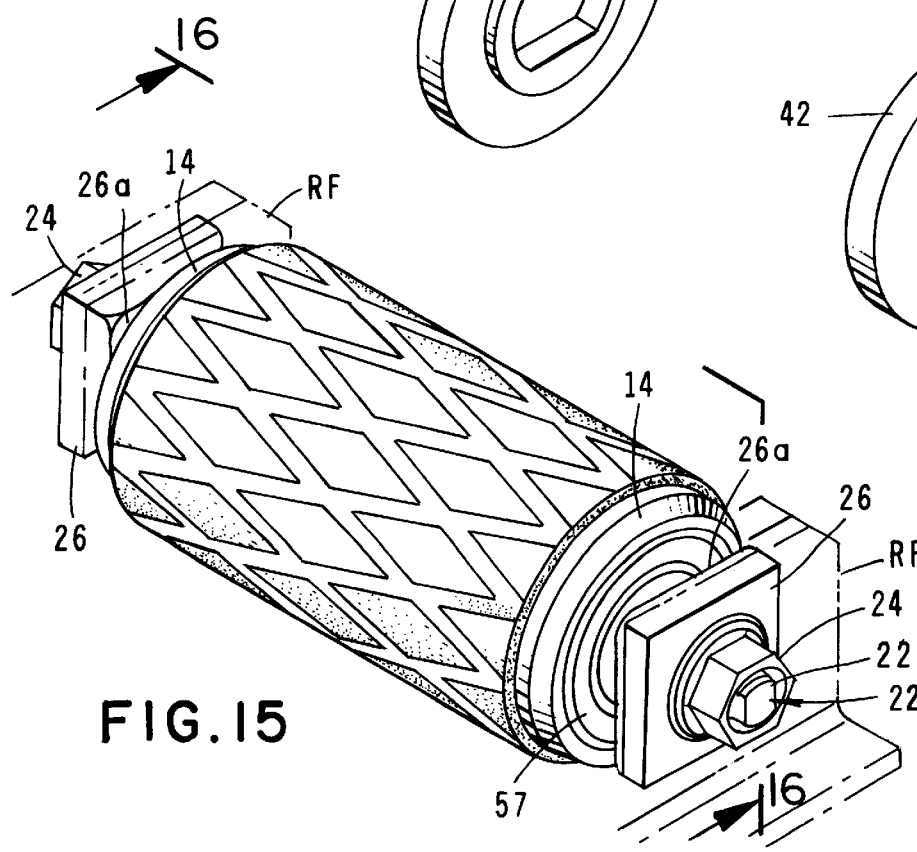
FIG.15

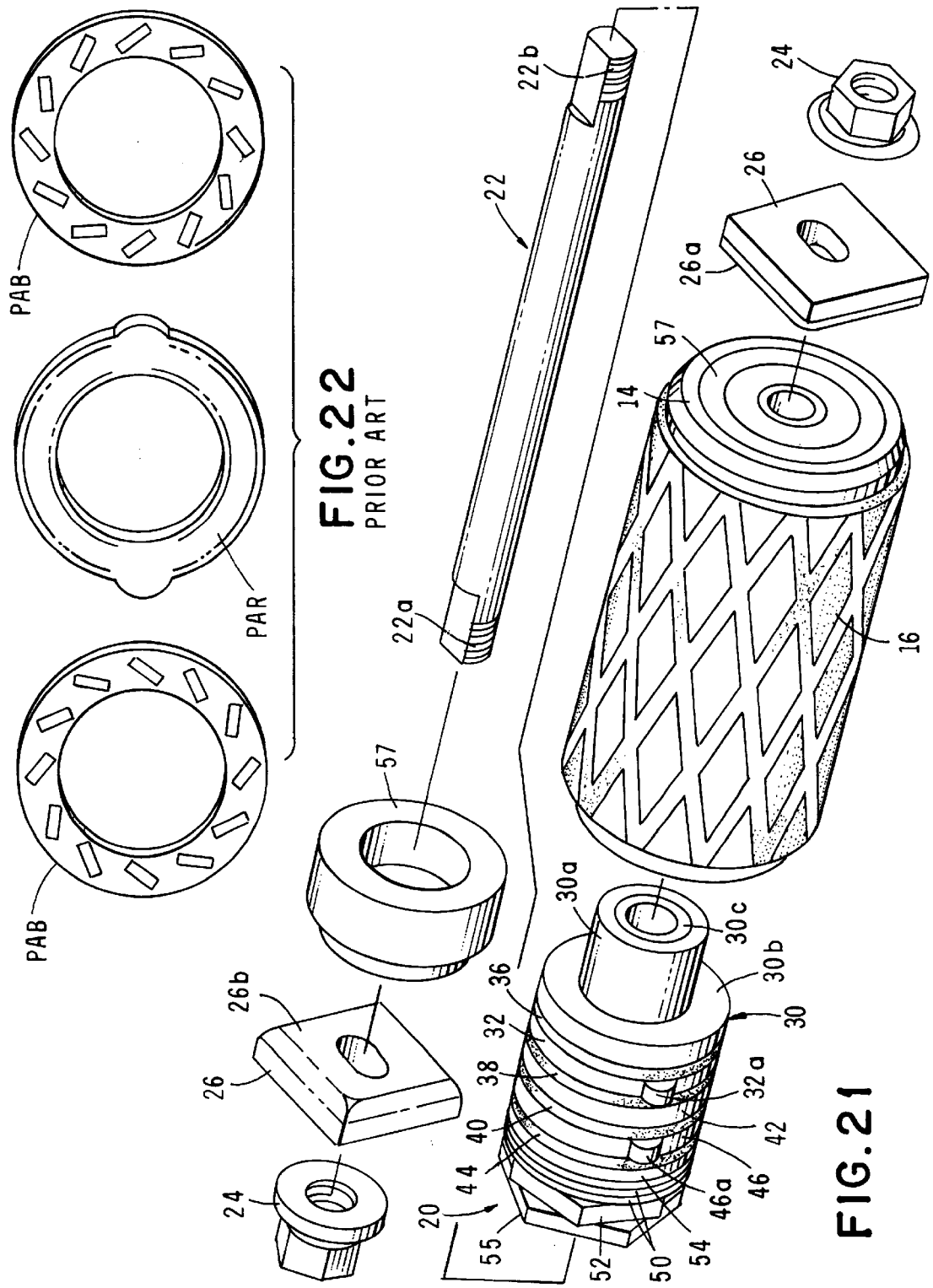

BRAKING ROLLER

BACKGROUND OF THE INVENTION

1. Field of the Invention

The present invention relates generally to aircraft cargo handling apparatus. More particularly, the invention concerns a novel improved braking roller for mounting in a floor mounted roller frame of the character typically installed in aircraft cargo bays to prevent accidental and unintended movement of cargo containers within the cargo compartments during flight and during cargo loading operations.

2. Discussion of the Invention

It is common in cargo transport vehicles such as cargo airplanes to provide a plurality of in-line, floor mounted roller frames which rollably support the cargo containers or unit load devices (ULD's) during cargo loading and unloading operations. As a general rule, the ULDS are quite heavy and as they are rolled toward the forward and rearward bulk heads of the cargo bays it is desirable to provide braking rollers which apply braking forces to the ULDS as they roll rearwardly within the cargo bays. Once the ULDS are in position within the cargo bays or compartments the braking rollers also function to prevent unintended forward movement of the ULD's during flight and preparatory to unloading.

In the past, a number of different types of braking roller devices have been suggested. One such braking roller device is manufactured and sold by Tel Air International Cargo Systems of Hausham, Germany. This braking roller assembly, which is sold under model No. P-N89056, comprises a generally cylindrical shaped ULD engaging outer roller which is rotatably mounted on an elongated shaft that spans a conventional roller frame. Received over the outer shaft is a roller clutch assembly which is freely rotatable relative the shaft in one direction, but is blocked against rotation in an opposite direction. Also mounted on the shaft is a single rotor element which is rotatably driven by the ULD engaging outer roller of the braking device. To resist rotational movement of the rotor, complex and expensive, oppositely canted roller bearings are provided on either side of the rotor. A spring mechanism forces the assemblage made up of the single rotor and the two oppositely canted roller bearings against a radially outwardly extending flange provided on the roller clutch. With this construction, rotation of the cargo engaging roller in one direction is unimpeded. However, rotation of the roller in the opposite direction is controllably resisted by the oppositely canted roller bearings, one of which engages one side of the rotor and the other of which engages the other side of the roller as well as the flange on the roller clutch.

The apparatus of the present invention constitutes a substantial improvement over the Tel Air braking roller assembly and eliminates the use of the costly and somewhat unreliable canted roller bearings. In the improved braking roller assembly of the present invention, two cooperating rotors are mounted on the transverse shaft of the roller frame and four highly novel friction disks cooperate with the dual rotors to control their rotation. These novel friction disks are of a simple construction and take the place of the complex, oppositely canted roller bearings of the Tel Air device.

Unlike the oppositely canted roller bearings of the Tel Air device the novel friction disks of the apparatus of the present invention do not damage the rotors during use and at the same time provide superior braking forces to the pair of spaced apart cooperating rotors of the apparatus, which rotors are driven by a specially configured, improved ULD engaging outer roller element. The improved braking roller apparatus of the present invention thusly provides a device which exhibits superior performance, greater durability and reliability, and superior braking characteristics when compared to competing prior art braking roller assemblies. Additionally, because of its substantially less complex construction, the breaking roller apparatus of the present invention can be manufactured more economically and requires substantially less maintenance than do the prior art braking roller devices.

SUMMARY OF THE INVENTION

It is an object of the present invention to provide an improved braking roller apparatus for preventing unintended movement of cargo containers within cargo compartments of the character found in cargo transport vehicles such as cargo aircraft. More particularly, it is an object of the invention to provide an improved braking roller apparatus of the aforementioned character which includes highly novel, internal friction producing elements that smoothly and effectively resist rotation of a pair of cooperating rotors which are driven by a uniquely configured ULD engaging outer housing. The rotors and the cooperating friction elements in turn cooperate with a one way roller clutch assembly in a manner to positively impede rotation of the ULD engaging outer housing in a first direction while allowing its free, unrestricted rotation in an opposite direction.

Another object of the invention is to provide an improved braking roller apparatus of the type described in the preceding paragraph which conveniently mounts into existing prior art roller trays of the type generally used in the cargo bays of transport vehicles such as cargo aircraft.

Another object of the invention is to provide an improved braking roller apparatus which incorporates a plurality of unique, internally mounted friction elements which act against redundant driven rotors that are driven by the novel ULD engaging housing as the cargo containers are moved within the cargo bay along a plurality of linerally aligned roller trays mounted on the floor of the cargo bay.

Another object of the invention is to provide an improved braking roller apparatus of the character described in the preceding paragraph which produces substantial braking torque while at the same time is of a highly simple and relatively inexpensive construction. More particularly, it is an object of the invention to provide such an apparatus in which the cooperating, internal friction elements comprise novel fiberglass substrates that are coated with a homogeneous composite matrix of a polyester resin base with polytetrafluorethylene and other solid particle additives.

Another object of the invention is to provide an improved braking roller apparatus as described herein in which the internal friction producing elements maintain high performance characteristics in environments of relatively high temperature and substantially reduced pressure.

Another object of the invention is to provide an improved braking roller apparatus of the aforementioned character in which the internal friction producing elements thereof also exhibit superior corrosion resistance.

Still another object of the invention is to provide an improved braking roller apparatus for use in the cargo bays of transport vehicles which provides superior performance characteristics and at the same time can be inexpensively manufactured, assembled and maintained.

BRIEF DESCRIPTION OF THE DRAWINGS

FIG. 10 is a generally perspective view of one of the pair of cooperating belleville washers which comprise a part of the driven assembly shown in FIGS. 6 and 7.

FIG. 11 is a side elevational view of the belleville washer shown in FIG. 10.

FIG. 12 is a front view of the belleville washer shown in FIGS. 10 and 11.

FIG. 13 is a generally perspective view of one of the pair of spacer washers which comprise a part of the driven assembly shown in FIGS. 6 and 7.

FIG. 14 is a generally perspective view of another of the spacer washers of the driven assembly.

FIG. 15 is a generally perspective view of one form of the fully assembled improved braking roller apparatus of the invention shown mounted in a roller frame, the roller frame being depicted in phantom lines.

FIG. 21 is a generally perspective, exploded view of the improved braking roller apparatus of one form of the invention.

FIG. 22 is a generally perspective view of a portion of a prior art braking roller apparatus which includes a pair of canted roller bearings which act upon the single rotor of the device to resist rotation of the rotor.

DESCRIPTION OF THE INVENTION

Figure 1:
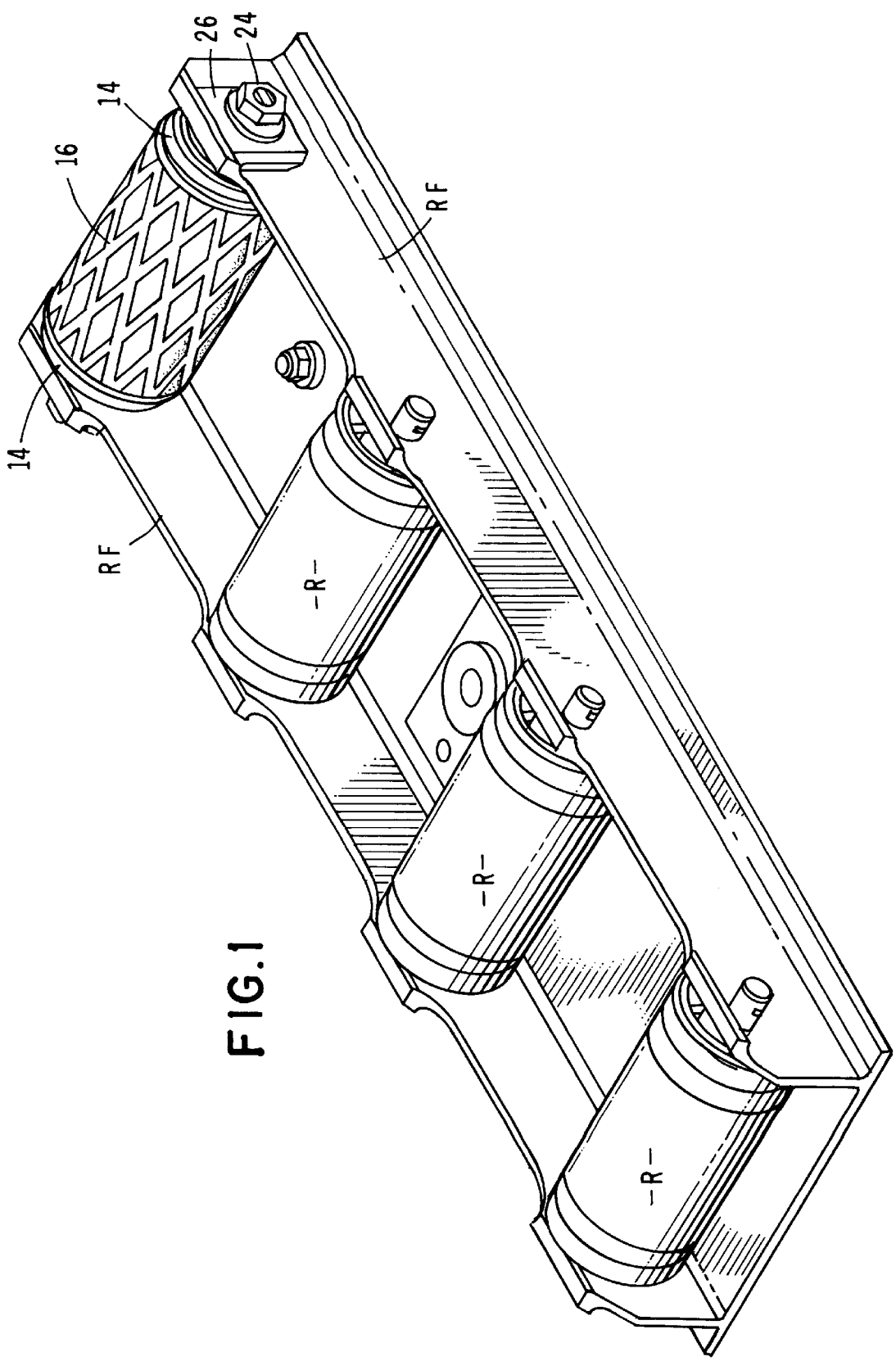
FIG. 1 is a generally perspective view of one form of the roller frame of the invention within which an improved braking roller apparatus is mounted proximate one end thereof.
Figure 2:
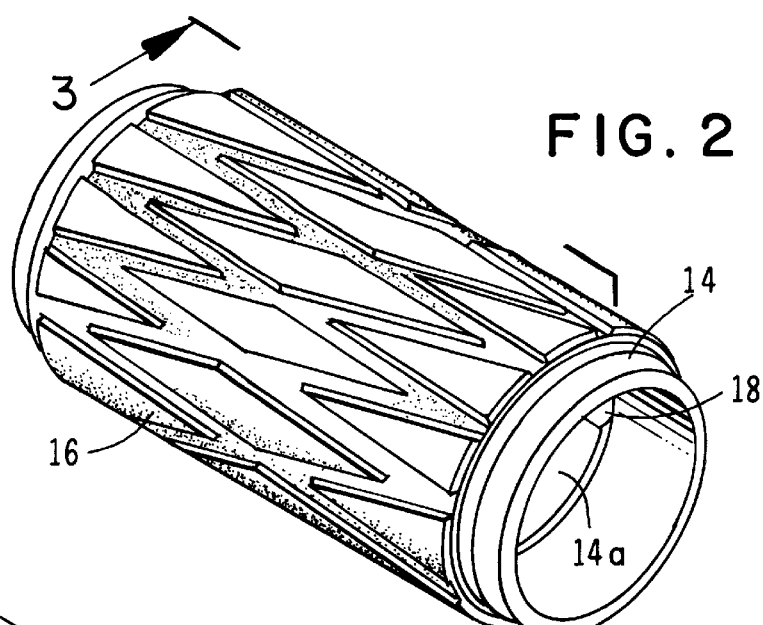
FIG. 2 is a generally perspective view of the generally cylindrically shaped ULD engaging roller housing of the improved braking roller apparatus of the invention.
Figure 3:
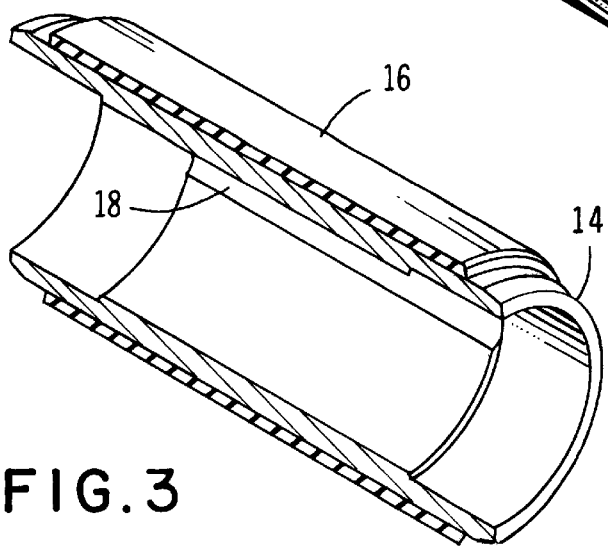
FIG. 3 is a cross-sectional view taken along lines 3—3 of FIG. 2.
Figure 4:
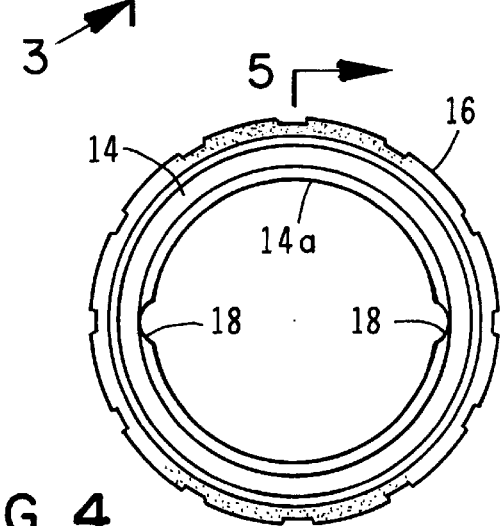
FIG. 4 is end view of the ULD engaging roller housing shown in FIG. 2.
Figure 5:
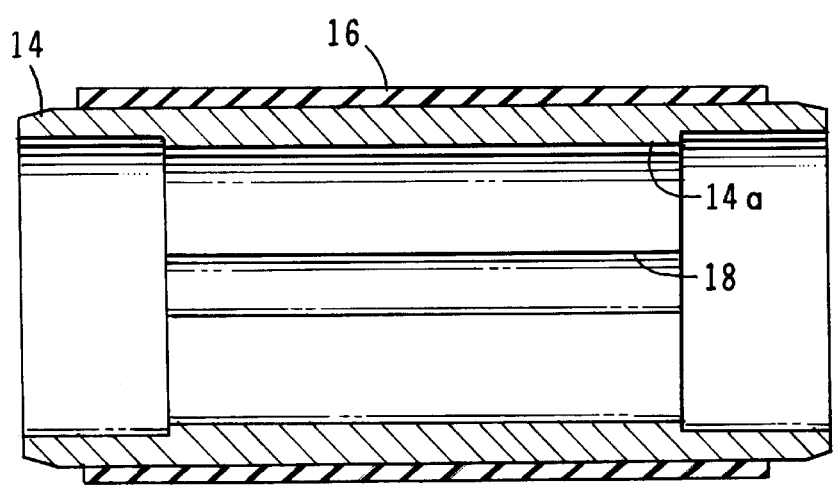
FIG. 5 is a somewhat enlarged, cross-sectional view of the housing taken along lines 5—5 of FIG. 4.

Referring to the drawings and particularly to FIGS. 1 through 7, one form of the apparatus of the invention is there illustrated. In FIG. 1 the improved braking roller assembly of the invention is shown mounted in a conventional prior art roller frame generally designated in the drawings as "RF". In the present form of the invention, the improved braking roller assemblage comprises a generally cylindrically shaped outer driving roller or housing 14 having an outer circumferentially extending, tread like surface 16 comprising a grooved elastomeric material, as for example, a synthetic rubber. (See also FIG. 2) As best seen by referring also to FIGS. 3 and 4, a pair of longitudinally extending, circumferentially spaced apart ear receiving grooves 18 are formed on the inner wall 14a of housing 14. (See also FIG. 5)

Figure 6:
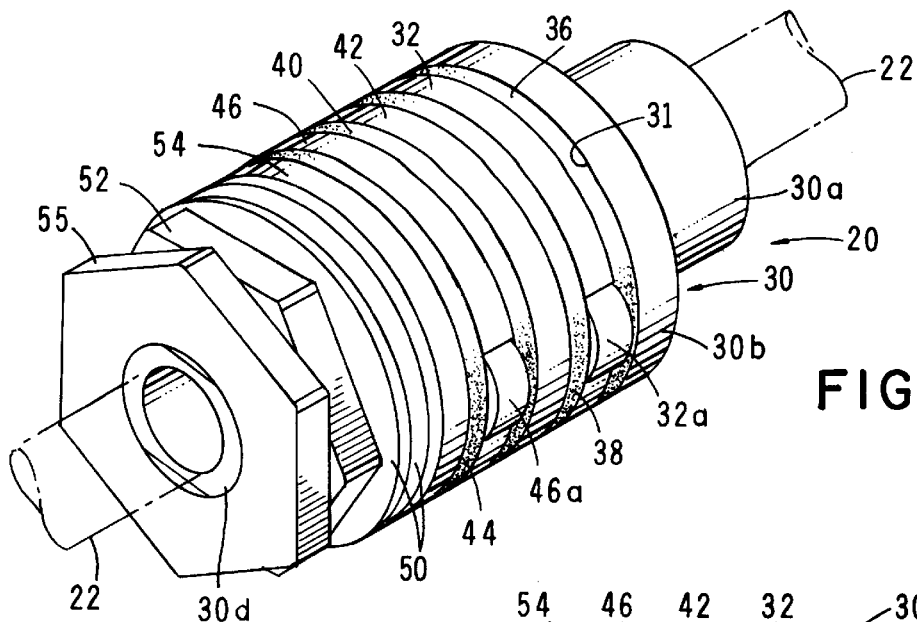
FIG. 6 is a generally perspective view of one form of the driven assembly of the invention which is telescopically receivable within and driven by the ULD engaging roller housing shown in FIG. 2.
Figure 19:
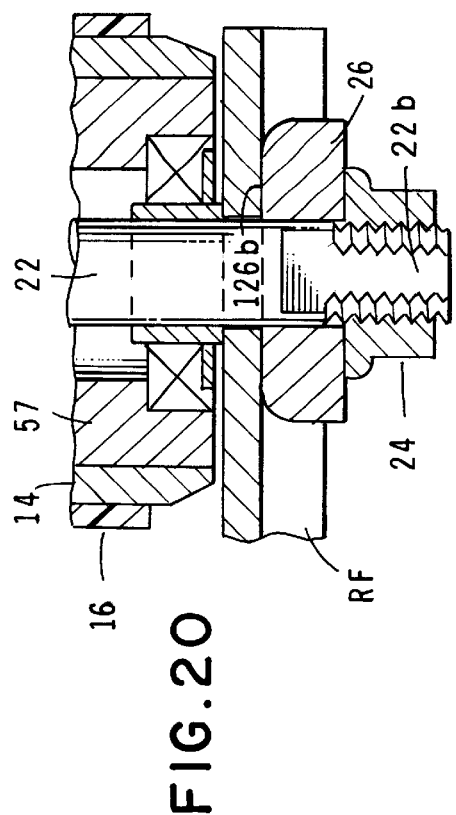
FIG. 19 is a cross-sectional view taken along lines 19—19 of FIG. 16.

Telescopically receivable within the ULD engaging roller housing 14 is a driven assembly which is generally designated in FIG. 6 by the numeral 20. As best seen in the FIGS. 6, 7 and 16, driven assembly 20 comprises a centrally disposed shaft 22 (FIG. 16) having first and second externally threaded ends 22a and 22b which are adapted to be mounted within roller frame RF in the manner shown in FIGS. 1, 16 and 19. More particularly, ends 22a and 22b of the shaft threadably receive internally threaded nuts 24 which are adapted to be cinched up against a pair of square retainers 26. Retainers 26 include inboard surfaces 26a which engage the side walls of the frame RF to secure the braking roller apparatus in position within roller frame RF. (FIGS. 16 and 19)

Figure 18:
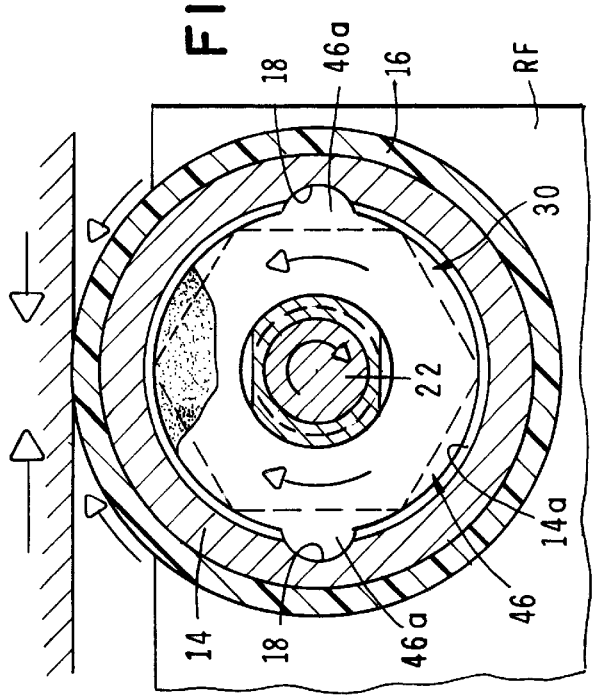
FIG. 18 is a cross-sectional view taken along lines 18—18 of FIG. 16.
Figure 20:
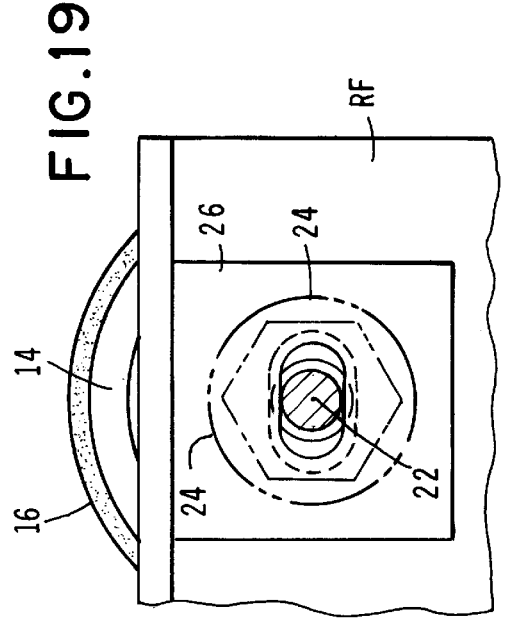
FIG. 20 is an enlarged cross-sectional view taken along lines 20—20 of FIG. 16.

Mounted on shaft 22 is a roller clutch assembly 30 which is of a conventional, commercially available construction. As best seen in FIGS. 16 and 18, roller clutch assembly 30 includes a hub portion 30a and a flange portion 30b. Roller clutch 30 also includes a roller bearing race 30c which is specially designed to act upon shaft 22 in a manner to permit free rotation in a first direction, but to impede its rotation in the opposite direction. Roller clutch 30, which also includes an inboard hub portion 30d having flats formed therein, is of a character well known to those skilled in the art and is readily commercially available from a number of sources, including the Kamatics Company of Bloomfield, Conn. A suitable roller clutch for use in the apparatus of the present invention is sold by this company under the designation "Drawn Cap Roller Clutch, Model HF0812".

Figure 7:
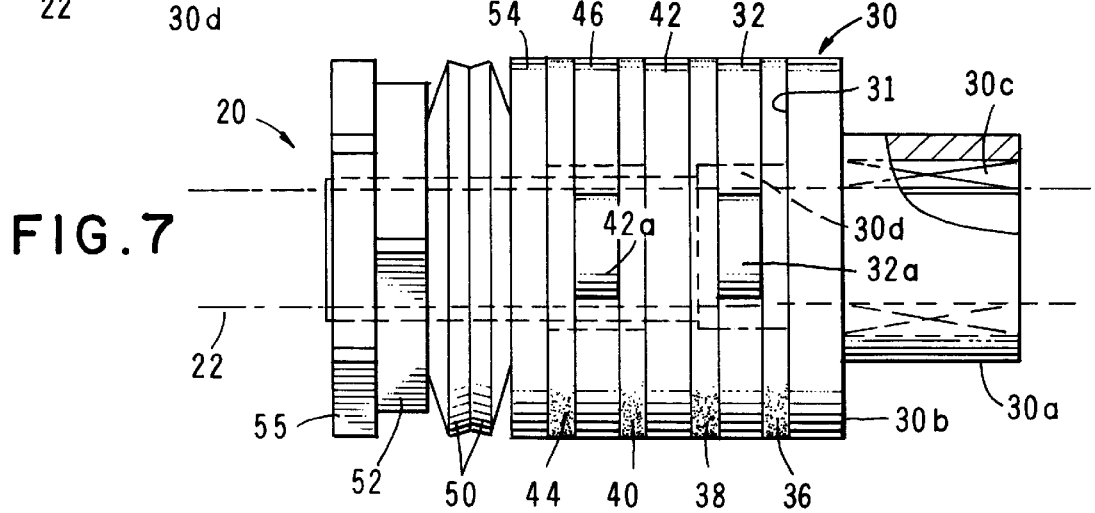
FIG. 7 is a side elevational view of the assemblage shown in FIG. 6 partly broken away to show internal construction.
Figure 8:
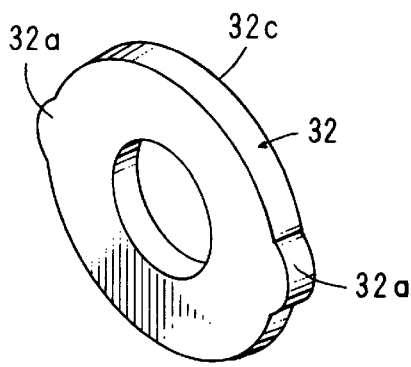
FIG. 8 is a generally perspective view of one of the pair of rotors which comprise a part of the driven assembly shown in FIGS. 6 and 7.
Figure 9:
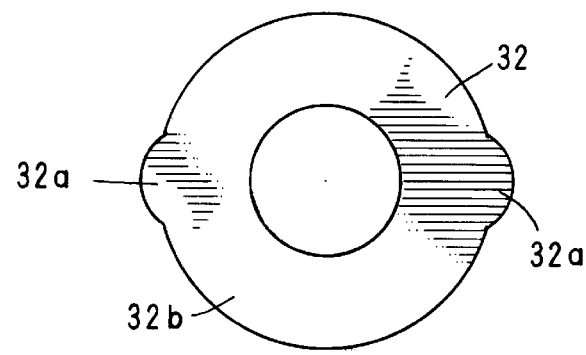
FIG. 9 is a front view of the rotor shown in FIG. 8.
Figure 16:
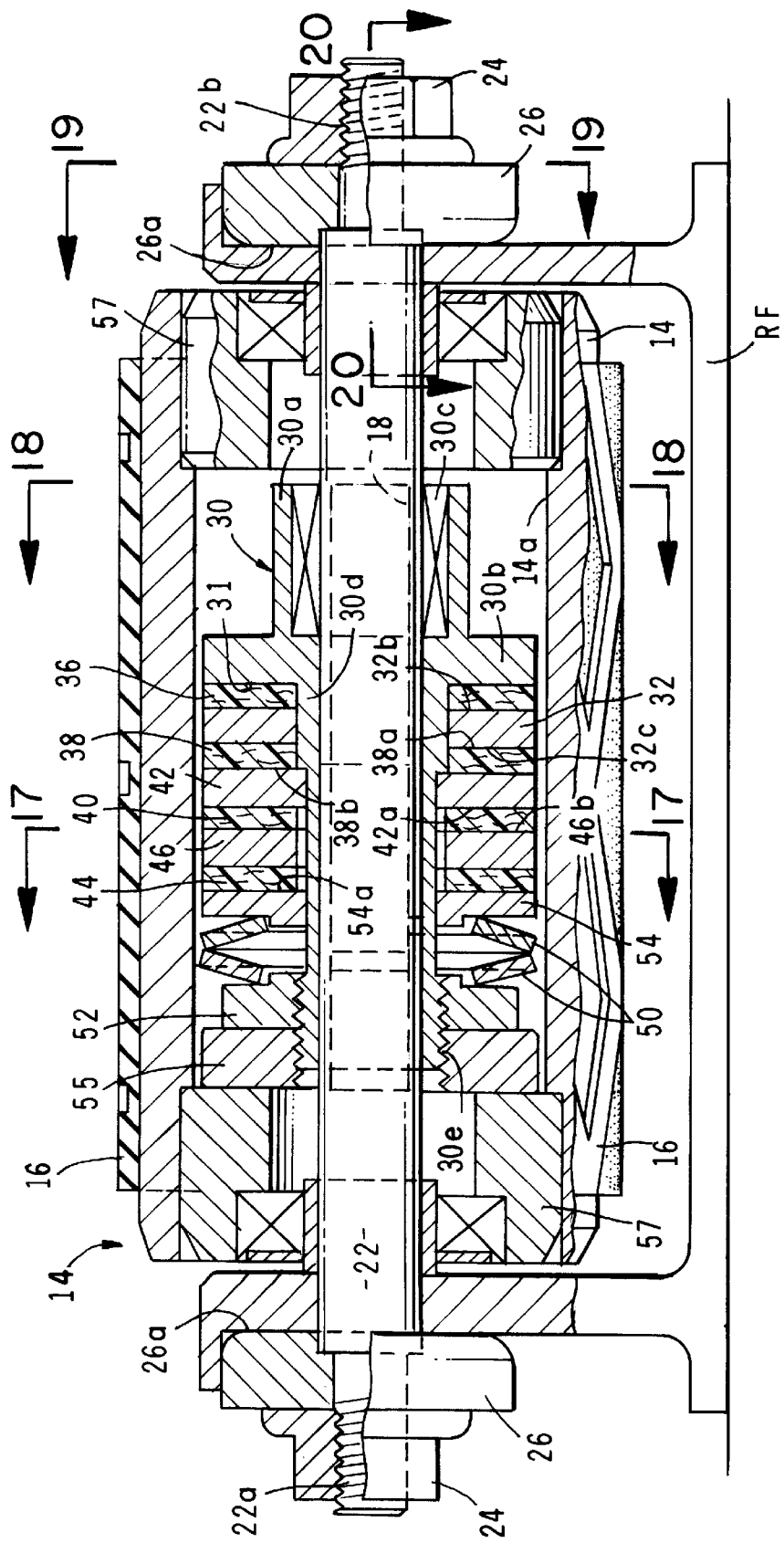
FIG. 16 is a greatly enlarged cross-sectional view taken along lines 16—16 of FIG. 15.

Also forming a part of the driven assembly 20 of the improved braking roller apparatus of the invention is a first, centrally apertured rotor 32 which is mounted on the inboard hub 30d of roller clutch 30 in the manner best seen in FIGS. 6, 7 and 16. "Hub portion 30d telescopically receives shaft 22 and, as shown in FIG. 16, includes proximate its inboard end, a threaded portion 30f. As shown in FIGS. 6, 8 and 9, rotor 32 is provided with a pair of circumferentially spaced apart ears 32a which are receivable within the longitudinally extending ear receiving grooves 18 formed in housing 14. Rotor 32 includes opposing surface 32b and 32c. Disposed between rotor 32 and the inboard of surface 31 of flange 30b of roller clutch 30 is a novel, first friction producing element or disk 36, the purpose and characteristics of which will presently be described. Also mounted on the inboard hub 30d of roller clutch 30 in a longitudinally spaced apart location from disk 36 is a second friction disk 38. As best seen in FIG. 16, surface 38a of disk 38 is in frictional engagement with surface 32c of rotor 32. The opposing surface 38b of friction disk 38 is in frictional engagement with a first, centrally apertured shim, or washer 42 (see FIG. 14) which is disposed between friction disk 38 and a third friction disk 40 which is also received over hub 30d. A fourth friction disk 44 is also mounted over hub 30d in the location shown in FIG. 16. Disks 36, 38, 40 and 44 can be constructed from various materials, but a fiberglass substrate coated with a polyester resin base having contained therewithin polytetrafluorethylene and other solid particulate additives has proven quite satisfactory in practice. Such disks exhibit high performance characteristics in high temperature, low pressure environments and also exhibit superior corrosion resistance.

Figure 17:
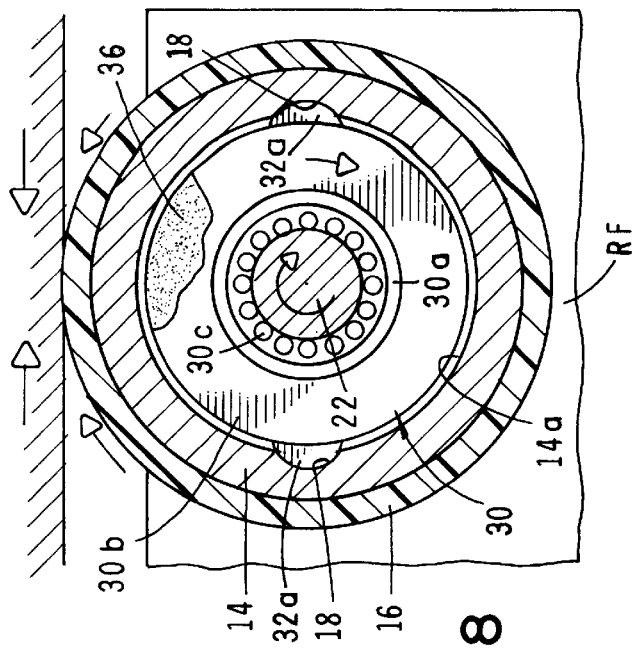
FIG. 17 is a cross-sectional view taken along lines 17—17 of FIG. 16.

Disposed intermediate friction disks 40 and 44 is a second, centrally apertured rotor 46. Rotor 46 is of identical construction to rotor 32 and, like rotor 32, is provided with circumferentially spaced apart ears 46a which are adapted to be closely received within and driven by ear receiving grooves 18 formed in cylindrically shaped ULD engaging housing 14. With the construction thus described, as roller housing 14 is rotated, rotors 32 and 46 will also be urged to rotate. (See FIG. 17)

Also forming a part of the driven assembly of the braking roller apparatus of the present form of the invention is a pair of Belleville springs 50 which are arranged in series (FIG. 16). Belleville Springs, such as disk springs 50, comprise the biasing means of the invention for urging the friction disks rotor assemblage toward flange 30b of the roller clutch and are of a character well known by those skilled in the art and are readily commercially available from a number of commercial suppliers. In the present construction, the Belleville washers are placed under compression by compression means, here comprising a nut 52 which is threadably mounted on a threaded portion 30f of hub 30d of the roller clutch (FIG. 16). When compressed by nut 52, the Belleville springs will act upon a second, stepped shim or washer 54 which, as shown in FIG. 16, is located intermediate the Belleville washers and fourth friction disk 44 (see also FIG. 13). It is apparent that when the Belleville washers 50 act compressively on washer 54, friction disk 36 will be placed in friction engagement with flange portion 30b of roller clutch assembly 30 and also in frictional engagement with surface 32b of rotor 32. In similar fashion, friction disk 38 will be urged into frictional engagement with surface 32c of rotor 32 and also into frictional engagement with spacer washer 42. In like manner, friction disk 40 will be moved into frictional engagement with the opposite surface 42a of washer 42 and also into frictional engagement with surface 46a of rotor 46. Finally, fourth friction disk 44 will be urged into frictional engagement with surface 46b of rotor 46 and with the inboard surface 54a of washer 54. As best seen in FIG. 6, a locking nut 55 engages nut 52 and functions to hold the Belleville washer in the compressed configuration.

Turning to FIGS. 16 and 21, it is to be noted that driven assemblage 20 is closely telescopically received within housing 14 with ears 32a and 46a of the driven rotors disposed within the grooves or channels 18 formed in the outer housing 14. To center assemblage 20 within housing 14 and to support shaft 22, hub roller and bearing assemblies 57 are provided at either end of assemblage 20. (See particularly FIG. 16)

It is apparent that with the construction thus described, as a cargo container or ULD rolls over the various rollers "R" mounted within a particular roller frame "RF" and in so doing pressurally engages the tread like surface 16 of housing 14 of the apparatus, roller clutch 30 can freely rotate relative to shaft 22 in a first direction. However, when forces are imposed on the housing by a ULD which tend to rotate it in the opposite direction, rotation of roller clutch 30 and housing 14 will be impeded as a result of the frictional impedance offered by the friction disks of the assemblage acting respectively against shims 42 and 54 and rotors 32 and 46. These important friction disks of the apparatus of the invention, which cooperate with the redundant rotors 32 and 46 to retard opposite rotation of roller housing 14, uniquely take the place of the single rotor "PAR" and the two oppositely canted bearings "PAB" of the prior art Tel Air device a portion of which is shown in FIG. 22 of the drawings. Accordingly a high reliability, high performance, improved braking apparatus is thus provided.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made with out departing from the scope and spirit of the invention, as set forth in the following claims.

I claim:

1. An improved braking roller apparatus mounted on a roller frame comprising:
   (a) a generally cylindrically shaped driving roller housing having circumferentially spaced-apart, longitudinally extending ear receiving grooves; and
   (b) a driven assembly telescopically receivable within said roller housing, said driven assembly comprising:
      (i) a shaft having first and second ends connected to the roller frame;
      (ii) a roller clutch assembly mounted on said shaft for free rotation in a first direction, but for impeded rotation in an opposite, second direction, said roller clutch assembly including a hub portion and a radially outwardly extending flange portion;
      (iii) a first rotor mounted on said hub portion, said first rotor having circumferentially spaced-apart ears receivable within said ear receiving grooves;
      (iv) a rotor friction disk mounted on said hub portion intermediate said first rotor and said flange portion of said roller clutch;
      (v) second and third friction disks mounted on said hub portion;
      (vi) a first shim mounted on said shaft intermediate said second and third friction disks;
      (vii) a second rotor rotatably mounted on said hub portion proximate said third friction disk; and
      (viii) biasing means mounted on said hub portion for urging said first, second and third friction disks toward said roller clutch.

2. An apparatus as defined in claim 1 in which said first, second and third friction disks each comprise a fiberglass substrate coated with a coating comprising a resin material having particulate matter contained therein.

3. An apparatus as defined in claim 2 in which said coating includes polytetrafluorethylene.

4. An apparatus as defined in claim 1 in which said roller housing is provided with a grooved, elastomeric outer surface.

5. An apparatus as defined in claim 1 further including a fourth friction disk mounted on said hub portion proximate said second rotor.

6. An apparatus as defined in claim 1 in which said driven assembly further includes a pair of hub roller bearing assemblies mounted on said shaft for rotatably supporting said roller housing.

7. An apparatus as defined in claim 1 in which said biasing means compromises at least one belleville spring mounted said hub portion.

8. An apparatus as defined in claim 1 in which said biasing means comprises a pair of belleville springs mounted on said hub portion in series.

9. A braking roller mounting on a roller frame comprising:
   (a) a generally cylindrically shaped driving roller housing having circumferentially spaced-apart, longitudinally extending ear receiving grooves; and
   (b) a driving assembly telescopically receivable within said roller, said driven assembly comprising:
      (i) a shaft having first and second ends mounted in the roller frame;

(ii) a roller clutch mounted on said shaft for free rotation in a first direction, but for impeded rotation in an opposite second direction, said roller clutch having a hub portion and a radially outwardly extending flange portion;

(iii) a first rotor mounted on said hub portion said first rotor having circumferentially spaced-apart ears receivable in said ear receiving grooves;

(iv) a first friction disk mounted on said hub portion intermediate said first rotor and said flange portion of said roller clutch;

(v) second and third friction disks mounted on said hub portion;

(vi) a first washer mounted on said hub portion intermediate said second and third friction disks;

(vii) a fourth friction disk mounted on said hub portion;

(viii) a second rotor rotatably mounted on said hub portion intermediate said fourth friction disk and said washer;

(ix) a first Belleville washer mounted on said hub portion;

(x) a second washer mounted on said hub portion intermediate said fourth friction disk and said belleville washer; and (xi) compression means for urging said belleville washer into pressural engagement with said second washer.

10. An apparatus as defined in claim 9 further including a second belleville washer mounted on said hub portion in series with said first belleville washer.

11. An apparatus as defined in claim 9 in which said roller housing is provided with a, grooved synthetic rubber outer surface.

12. An apparatus as defined in claim 9 in which said driven assembly further includes a pair of hub roller bearing assemblies for supporting said roller housing on said shaft.

13. An apparatus as defined in claim 9 in which said first, second and third friction disks each comprise a fiberglass substrate coated with a coating comprising a resin material having particulate matter contained therein.

14. An apparatus as defined in claim 13 which said coating includes polytetrafluorethylene.

* * * * *